United States Patent
Rawson, III

(10) Patent No.: US 6,687,756 B1
(45) Date of Patent: Feb. 3, 2004

(54) SWITCHED-BASED TIME SYNCHRONIZATION PROTOCOL FOR A NUMA SYSTEM

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,740

(22) Filed: May 25, 2000

(51) Int. Cl.$^7$ .............................................. G06F 13/00
(52) U.S. Cl. ..................................... 709/248; 709/400
(58) Field of Search .............................. 709/200, 201, 709/202, 248, 400

(56) References Cited

U.S. PATENT DOCUMENTS

| | | | | |
|---|---|---|---|---|
| 4,591,977 A | * | 5/1986 | Nissen et al. ............... | 364/200 |
| 5,250,943 A | | 10/1993 | Childs et al. ............ | 340/825.8 |
| 5,390,216 A | * | 2/1995 | Bilitza et al. ............... | 375/106 |
| 5,600,822 A | * | 2/1997 | Grice et al. .................. | 395/500 |
| 5,751,721 A | * | 5/1998 | Bloks .......................... | 370/509 |
| 5,802,378 A | * | 9/1998 | Arndt et al. ................. | 395/740 |
| 5,822,381 A | * | 10/1998 | Parry et al. .................. | 325/356 |
| 5,896,524 A | * | 4/1999 | Halstead, Jr. et al. ....... | 395/553 |
| 5,905,869 A | | 5/1999 | Hornung et al. ....... | 345/200.58 |

FOREIGN PATENT DOCUMENTS

EP 0971282 A1 1/2000

OTHER PUBLICATIONS

External Time Reference Synchronization Facility, IBM Technical Disclosure Bulletin, Jun. 1993, pp. 85–89, vol. 36, No. 06A, IBM Corp.

Method of Keeping and Synchronizing Time in a Message–Passing Distributed System, IBM Technical Disclosure Bulletin, May 1990, pp. 442–425, vol. 32, No. 12, IBM Corp.

* cited by examiner

Primary Examiner—Moustafa M. Meky
(74) Attorney, Agent, or Firm—Joseph P. Lally; Casimer K. Salys

(57) ABSTRACT

A system and method for synchronizing a set of nodes connected to a central switch in a multi-node data processing system, such as a NUMA data processing system, are disclosed. Initially, time base register values are retrieved from each of the set of nodes. A common time base register value is then determined based upon the time base register values received from the nodes. The common time base register value that is determined is then broadcast to each of the nodes. Prior to reading the time base register values, packet traffic among the set of nodes may be halted by broadcasting a halt traffic packet to each of the nodes. In this embodiment, normal packet traffic may be resumed after synchronization by broadcasting a resume traffic packet to each of the nodes. The time base register values may be read by issuing a special purpose interrupt from a node adapter to one of the node processors in response to the adapter receiving a read time base packet from the switch. The common time base register value may be determined by selecting the maximum of the time base register values read from each of the set of nodes and adjusting the maximum time base register value by an adjustment factor, such as the time required for a packet to travel from the central switch to a node processor plus the time required for a packet to travel from a node processor to the central switch. The synchronization process may be repeated periodically such as by initiating a synchronization each time a decrementing register of the central switch reaches zero.

23 Claims, 4 Drawing Sheets

SWITCHED-BASED TIME SYNCHRONIZATION PROTOCOL FOR A NUMA SYSTEM

BACKGROUND

1. Field of the Present Invention

The present invention generally relates to the field of multiprocessor computing systems and more particularly to synchronizing time base registers on various nodes of a multiprocessor system.

2. History of Related Art

Scalable shared memory multiprocessors are often built by interconnecting symmetric shared memory multiprocessor systems with relatively small numbers of processors per system using an interconnect that maintains cache coherency. Interconnecting shared multiprocessor (SMP) systems makes good use of other, preexisting, and often high volume products to create larger systems. The resulting system is a cache coherent, non-uniform memory access multiprocessor (ccNUMA). In addition, some architectures such as the PowerPC® architecture from IBM Corporation provide a per processor time register that increments at some divisor of the processor's own frequency. In the PowerPC® system, this register is called the time base register. The PowerPC® architecture requires that, on a multiprocessor system, the program perceptible values of the time base must increase monotonically. In other words, if a program reads the time base a first time and subsequently reads it a second time, the second value must be greater than or equal to the first value. This constraint implies that the values of the time base registers on multiple processors have to be close enough in value to each other that if a program runs first on one processor and then on another, the program reads a second time base value that is greater than or equal to the first one. Because the time to move a program from one processor to another is on the order of approximately 100 to 1000 processor cycles, and because the time base divisor is on the order of 10's of cycles, this requirement is not too stringent. Nevertheless, it does force a multi-node NUMA system to synchronize the time base registers of all of the processors in the system. Since there is typically no common oscillator on a NUMA system, the time base registers of the various nodes on the system may drift apart from each other over time. Accordingly, the time base registers must be resynchronized with each other periodically. Preferably, the method implemented to synchronize the time base registers is not too expensive in terms of network load or specialized hardware. While some hardware interconnection mechanisms have a common oscillator that can be used for this purpose and other architectures have a special packet format that carries a time value in its payload and ages this value as it is transmitted through the network, this hardware is not available on every implementation. In the absence of such hardware, it is still desirable to provide a time base synchronization mechanism to maintain the level of synchronization that is required by the system architecture. Therefore it is highly desirable to implement a mechanism and method for synchronizing the various nodes on a NUMA system without significantly increasing the cost or complexity of the system.

SUMMARY OF THE INVENTION

The problem described above is in large part addressed by a system and method for synchronizing a set of nodes connected to a central switch in a multi-node data processing system, such as a NUMA data processing system. Initially, time base register values are retrieved from each of the set of nodes. A common time base register value is then determined based upon the time base register values received from the nodes. The common time base register value that is determined is then broadcast to each of the nodes. Prior to reading the time base register values, packet traffic among the set of nodes is halted by broadcasting a halt traffic packet to each of the nodes. In this embodiment, normal packet traffic may be resumed after synchronization by broadcasting a resume traffic packet to each of the nodes. The time base register values may be read by issuing a special purpose interrupt from a node adapter to one of the node processors in response to the adapter receiving a read time base packet from the switch. The common time base register value may be determined by selecting the maximum of the time base register values read from each of the set of nodes and adjusting the maximum time base register value by an adjustment factor, such as the time required for a packet to travel from the central switch to a node processor plus the time required for a packet to travel from a node processor to the central switch. The synchronization process may be repeated periodically such as by initiating a synchronization each time a decrementing register of the central switch reaches zero.

BRIEF DESCRIPTION OF THE DRAWINGS

Other objects and advantages of the invention will become apparent upon reading the following detailed description and upon reference to the accompanying drawings in which.

Figure 1:
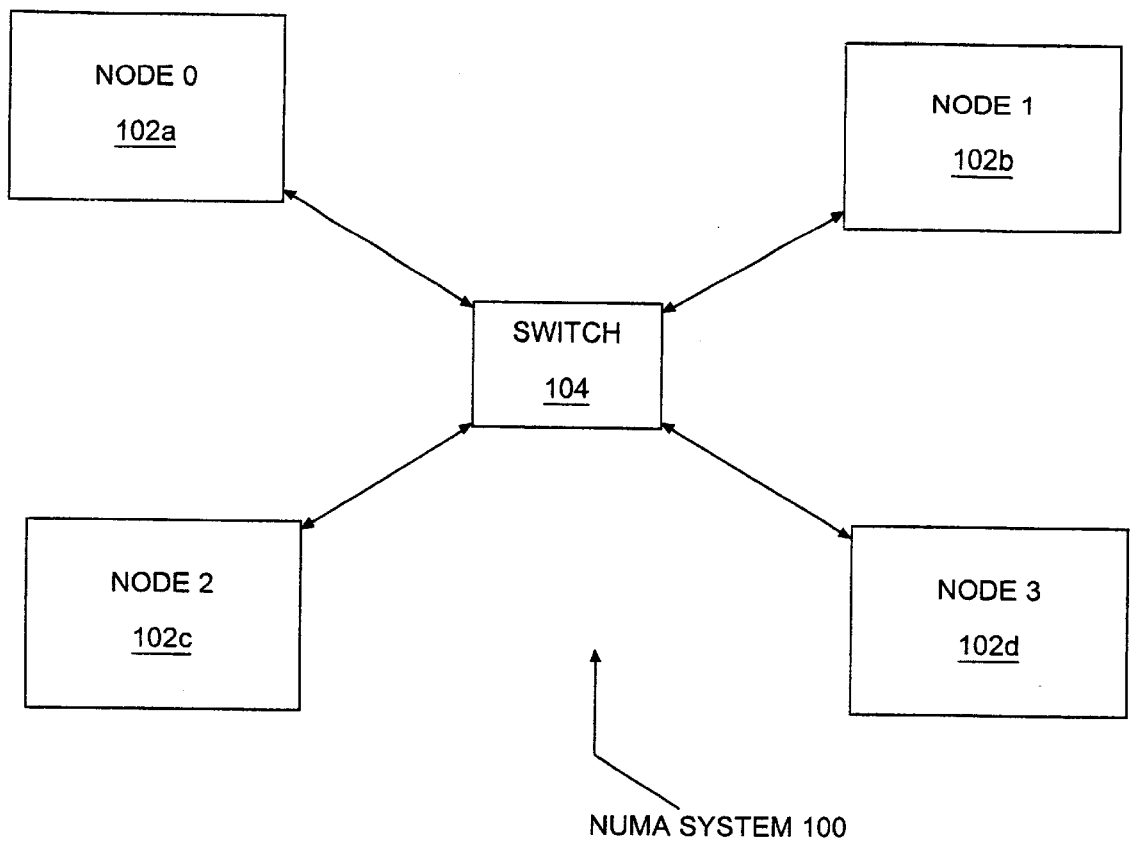
FIG. 1 is a block diagram of a non uniform memory architecture data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 1 is a high level block diagram of a NUMA data processing system 100 according to one embodiment of the invention. System 100 includes a set of nodes 102a, 102b, 102c, 102d (generically or collectively referred to here in as node(s) 102). The nodes 102 are interconnected by a central switch 104. Each node 102 includes at least one processor, such as a PowerPC® processor, having a time base register. In one embodiment, each node 102 is implemented as a symmetric multiprocessor (SMP) data processing system. In the preferred embodiment, central switch 104 is configured as an active device that can accept commands and initiate and respond to packets that are directed to it. Thus, packets may be addressed directly to central switch 104 rather than to any of the nodes 102. It will be appreciated that, although the depicted embodiment illustrates system 100 as having four nodes 102, alternative embodiments of system 100 may have fewer or more such nodes.

Figure 2:
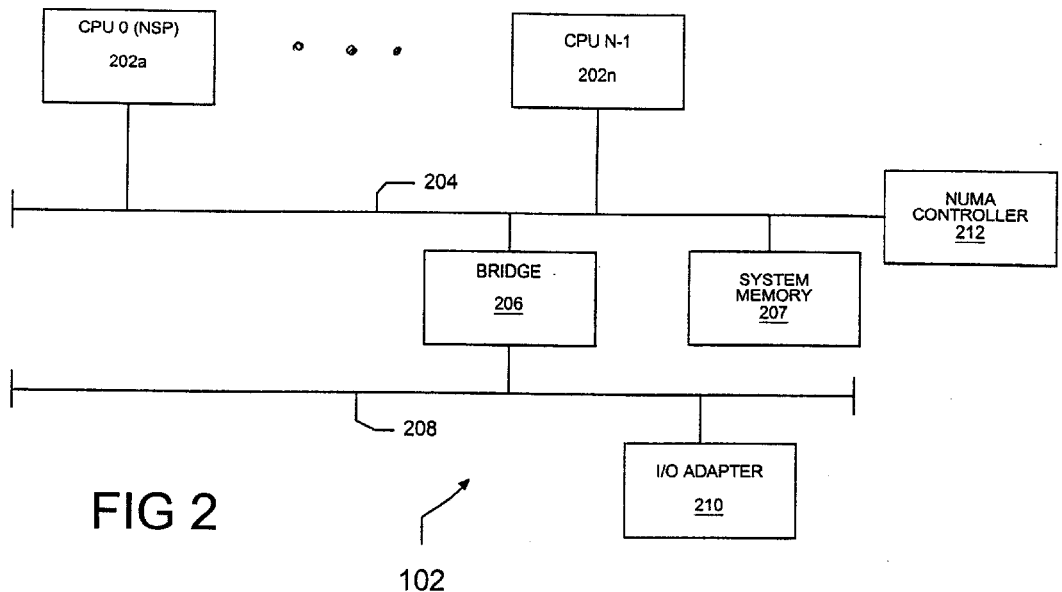
FIG. 2 is a block diagram of a symmetric multiprocessing system suitable for use as a node of the NUMA system of FIG. 1.

Turning now to FIG. 2, a block diagram of a node 102 suitable for use as a node within NUMA system 100 of the present invention is depicted. In the embodiment depicted in FIG. 2, node 102 is an SMP system that includes a set of processors 202a through 202n (generically or collectively referred to as processor(s) 202). Processors 202 are connected to a system memory 207 via a system bus 204. A bus bridge 206 connects system bus 204 to a peripheral bus 208 to which an I/O adapter 210 is connected. Peripheral bus 208 may comprise any of a variety of industry standard peripheral buses including, as examples, ISA, PCI, EISA, AGP, and other suitable peripheral buses. In addition, node 102 may include multiple such peripheral buses. Node 102 further includes a NUMA controller 212 connected to system bus 204 and suitable for connecting to central switch 104. Controller 212 provides for node-to-node and node-to-switch communication.

Figure 3:
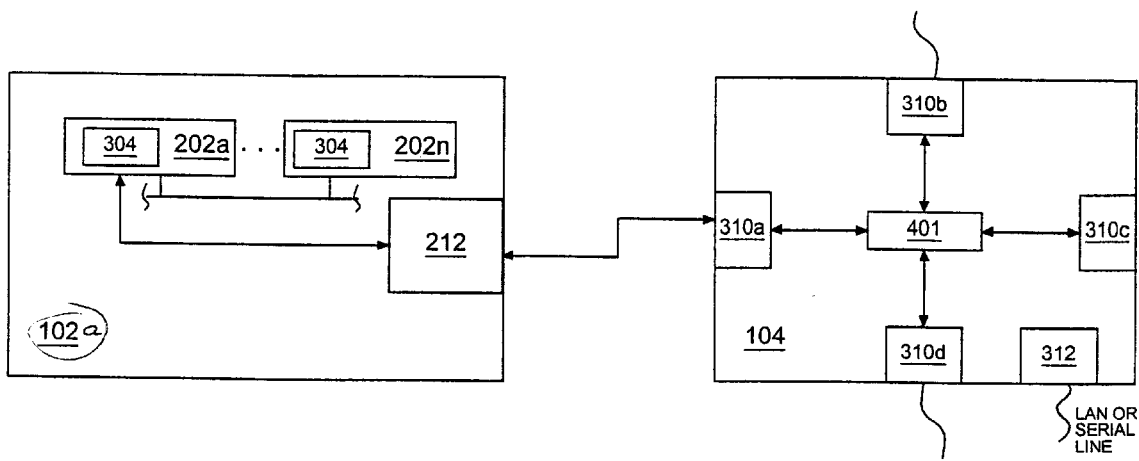
FIG. 3 is a block diagram illustrating a connection between the switch of FIG. 1 and a node synchronization processor.

Turning now to FIG. 3, additional detail regarding the interconnection between node 102a of system 100 and switch 104 is presented. In the depicted embodiment, each processor 202 of node 102a includes a time base register 304. In one embodiment, a first processor 202a is designated as a node synchronization processor (NSP) for each node 102. The time base register 304 of NSP 202a is accessible to NUMA controller 212, which is configured for communicating with switch 104 via a port 310a. (Switch 104 preferably includes a port 310 corresponding to each node 102 as discussed below). In one embodiment, such as an embodiment in which node 102a is implemented with PowerPC® processors, time base register 304 may be arbitrarily set to any value. (This embodiment should be contrasted with an implementation in which processors 202 are implemented with Intel IA-32 processors wherein any attempt to modify the contents of the time base register forces the contents of the register to zero). To comply with the requirement of monotonicity, the value of time base register 304 is preferably always set to a higher value than was previously set.

Figure 4:
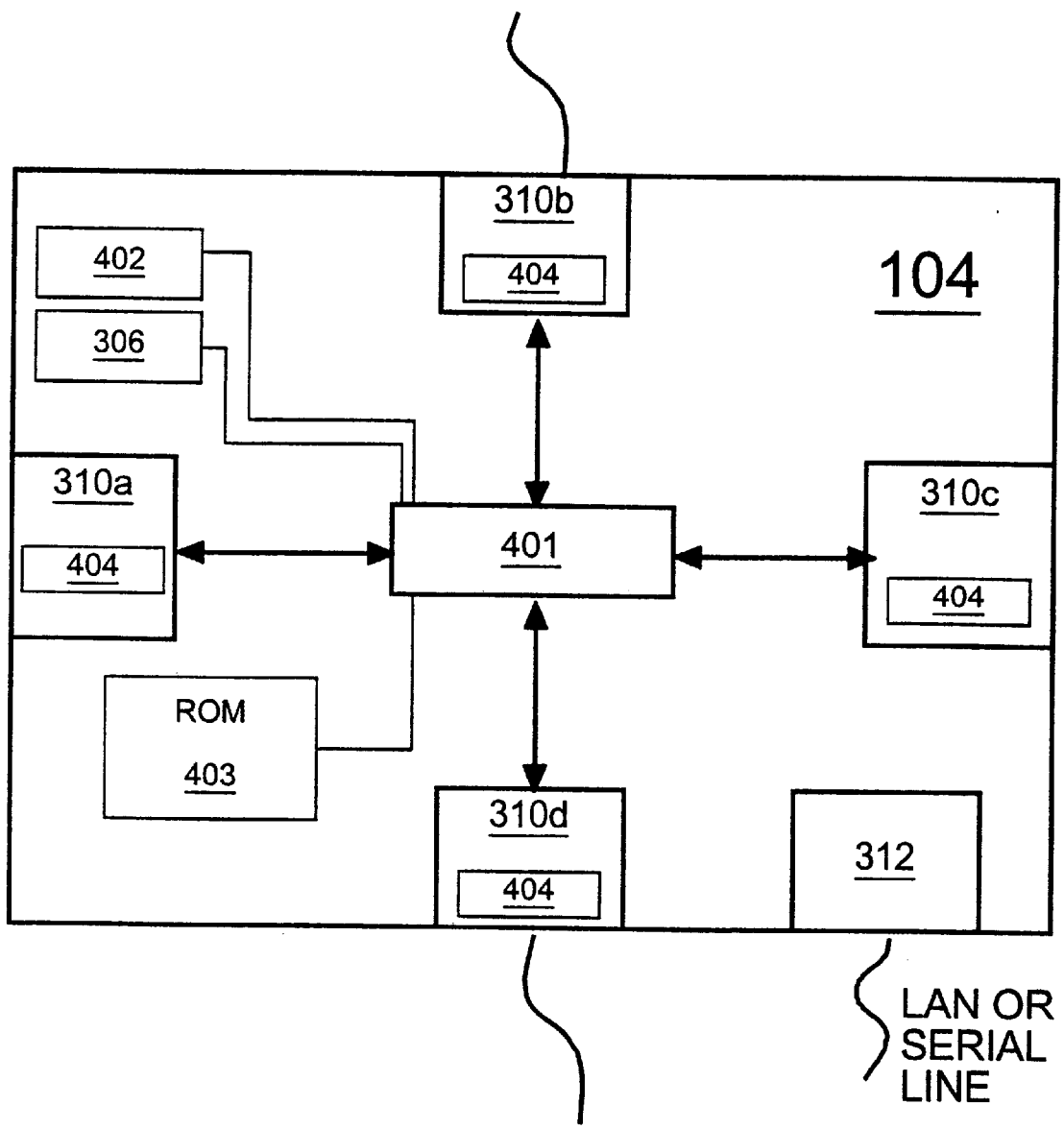
FIG. 4 is a block diagram of one embodiment of the switch of FIG. 1.

Turning now to FIG. 4, additional detail of central switch 104 according to one embodiment of the invention is illustrated. In the depicted embodiment, central switch 104 includes a processor 401 connected to a storage device 403, such as a ROM or other suitable non-volatile memory device, that contains processor executable instructions suitable for initiating and performing the node synchronization process described in greater detail below with respect to FIG. 5. Central switch 104 typically further includes random access memory (not explicitly depicted) that provides scratch memory for processor 401. The depicted embodiment of central switch 104 further includes a time base register 306 and a decrementing register 402 both connected to processor 401.

Central switch 104 further includes a set of ports 310a, 310b, 310c, and 310d (collectively or generically referred to herein as port(s) 310). Each port 310 corresponds to and is suitable for connecting to a node 102 of system 100. Each port 310 may include a port register 404 that facilitates the synchronization of nodes 102 by providing a facility for storing time base register values locally on central switch 104. In this embodiment, processor 401 is connected to each port 310 and is capable of reading values from and writing values to port registers 404.

In one embodiment, the port register 404 of each port 310 has the same number of bits as the time base register 304 of the corresponding node 102. In addition, switch 104 as depicted in FIG. 4 includes an additional port 312 that supports a connection to a local area network or a serial line. In one embodiment, this additional port 312 provides a method for managing switch 104.

In the preferred embodiment, the processor executable instructions stored in storage device 403 enable switch 104 to synchronize the time base registers of nodes 102 by retrieving time base register values from nodes 102, determining a common time base value based on the retrieved time base values, and broadcasting the common time base value back to each node 102. As depicted in FIG. 4, switch 104 further includes a decrementer register 402 that is preferably used to control the frequency of the synchronization process. In one embodiment, for example, decrementer 402 issues an interrupt that initiates the sychronization process when the value in register 402 reaches zero.

In the preferred embodiment, the frequency at which switch time base register 306 is updated is adjustable. The adjustment to the frequency of switch time base register 306 may be achieved by setting a multiplier or divider during a power on sequence so that switch 104 can match the frequencies of each of the NSPs 202a, which are assumed to be uniform. If, however, the frequency of switch time base register 306 is not adjustable, the synchronization mechanism of the present invention can compensate for the absence of an adjustable frequency by appropriately multiplying or dividing the time values that it sends to each node 102. In addition, if switch 104 has multiplication and division capacity, switch 104 can support NUMA systems 100 in which the various NSPs 202a operate at different frequencies. In an embodiment in which the various frequencies of NSPs 202a and switch 104 have a simple power of two relationship with each other, the multiplication and division functions can be implemented as simple shift operations.

In the preferred embodiment, switch 104 is enabled to broadcast packets to all of the NUMA controllers 212 of the various nodes 102 and to send packets to particular adapters. The invention contemplates the implementation of at least four special packet types that are used by the synchronization method protocol. The four packet types include a hold traffic packet type, a resume traffic packet type, a read time base (RTB) packet type, and a write time base (WTB) packet type. The hold traffic packet type is broadcast to each NUMA controller 212. When received by an NUMA controller 212, the hold traffic packet type causes the controller to hold all outbound packets to allow the interconnect among the various nodes 102 to drain off normal traffic thereby making it possible to transmit synchronization packets with a deterministic time delay. The resume traffic packet type, as its name implies, is also broadcast to each NUMA controller 212 and instructs the controllers to resume normal operation. The resume traffic packet type is used to resume normal operation at the conclusion of the synchronization process. The RTB and WTB packet types are used to retrieve and set the time base registers of the various NSPs 202a. The RTB packet type reads the time base register 304 of the NSP 202a of a node 102 to which the packet is addressed and returns the time base value to switch 104 storing the retrieved value in the corresponding port register 404. The WTB packet type writes a time base value from the appropriate port register 404 to the time base register 304 of the corresponding NSP 202a.

The time base synchronization mechanism is optimized if the time (TR) between the broadcast of a RTB packet type and the receipt of the time base values (assuming no other interconnect traffic) is known and fixed. Similarly, the time (TS) between the broadcast of a WTB packet type and the setting of new time base values in time base registers 304 of each NSP 202a is also preferably known and fixed. Each NUMA controller 212 is preferably able to access the time base register 304 of its corresponding NSP 202a. In one embodiment, for example, firmware on each NSP 202a is configured to respond to a special purpose interrupt from NUMA controller 212 and to respond by reading or writing the time base value stored in time base register 304 from or to NUMA controller 212. NUMA controller 212 may, for example, issue the special purpose interrupt upon receiving a read time base packet from switch 104. It should be noted that the sense of reading and writing may be reversed such that when an NSP 202a reads a time base value from NUMA controller 212, it writes a new value into time base register 304, while writing to NUMA controller 212 reads the current value of the time register 304 to NUMA controller 212.

Figure 5:
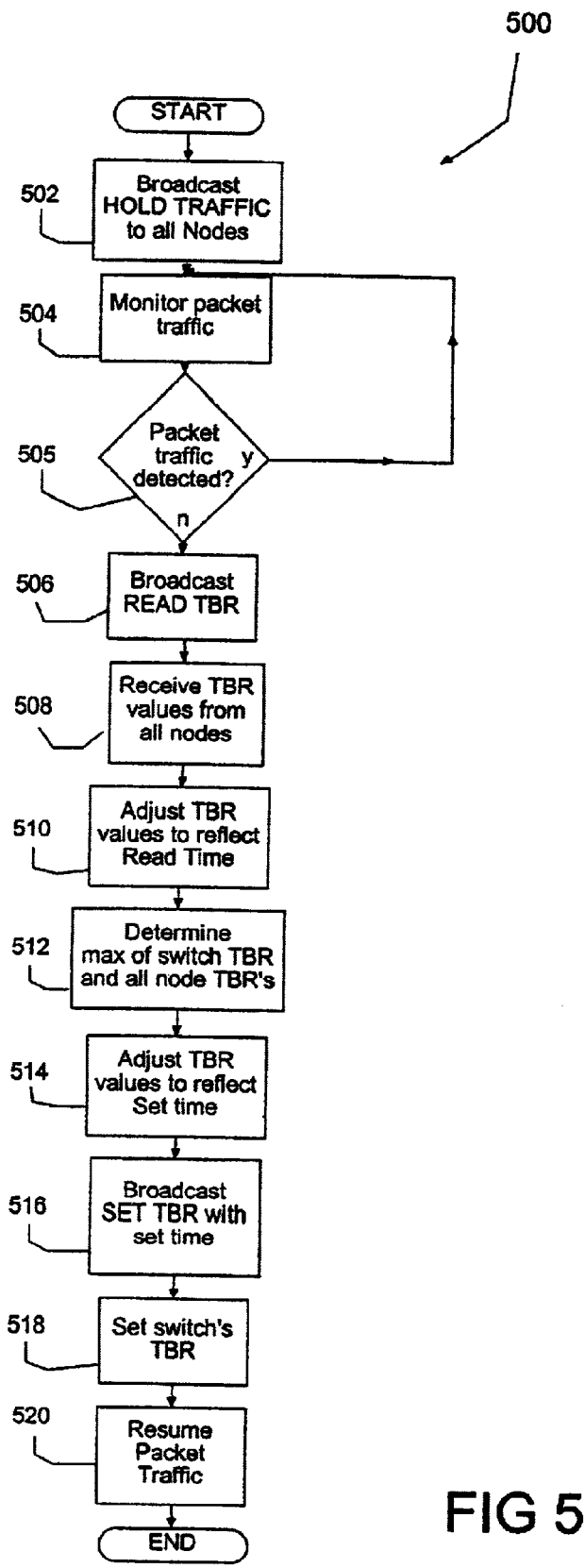
FIG. 5 is a flow diagram of a method of synchronizing time registers in a multi-node data processing system.

Turning now to FIG. 5, a flow diagram illustrating one embodiment of a method 500 of synchronizing a set of nodes of a data processing system, such as the nodes 102 of NUMA system 100, is depicted. Generally, the switch 104 synchronizes nodes 102 by retrieving time base register values from each node and then determining a common time base value based upon the set of retrieved time base values. The common time base value is then broadcast to each node to store the common time base value in the time base registers of each node.

As depicted in FIG. 5, synchronization method 500 includes an initial block 502 in which packet traffic is halted among the set of nodes 102. In one embodiment, switch 104 halts the packet traffic by broadcasting a hold traffic packet type to each node 102 prior to reading time base register values. Following the broadcast of the hold traffic packet, switch 104 monitors for packet traffic passing through it and determines (block 505) when packet traffic has decreased sufficiently to proceed with the synchronization method. In one embodiment, packet traffic is considered sufficiently halted when no packets are detected for a defined period of time, $T_W$. In other words, system 100 continues to monitor packet traffic (as represented by the feedback loop from block 505 to block 504 in FIG. 5) until packet traffic diminishes to below a predefined threshold.

When no packet traffic is detected, switch 104 broadcasts (block 506) an RTB packet type to each node 102. In response to receiving a read time base packet, each NUMA controller 212 responds by retrieving the current time base value from its corresponding time base registers 304. As indicated previously, the retrieval of time base register values from each NSP 202a may be achieved by configuring NUMA controller 212 to issue a special purpose interrupt to NSP 202a in response to receiving a read time base packet from switch 104 and by configuring each NSP 202a to return the value in time base register 202a.

After time base register values have been received (block 508) from each node 102, switch 104 determines a common time base value based on the received time base values. In the depicted embodiment, determining the common time base value occurs in blocks 510, 512, and 514. In block 510, switch 104 adjusts time base values received from each node to reflect the number of cycles (i.e., amount of time) required to retrieve the time base register values from each node 102. In one embodiment, the adjustment to the time base register values in block 510 is accomplished by adding a quantity TR to every retrieved value, where TR represents a previously determined delay characteristic of system 100. More specifically, TR represents the time required to retrieve a time base register value from a system node when normal packet traffic has been suspended. After adjustment of each time base register value in block 510, the maximum of the adjusted time base values is determined in block 512.

In an embodiment in which switch 104 includes its own time base register 306, the value in time base register 306 may be included in the determination of the common time base value such that the maximum time base value is the maximum of the time base values received from nodes 102 or the time base value in register 306, whichever is greater. Selection of the maximum value as the common time base value is consistent with the monotonicity constraint of time base register 304. In other words, by selecting the maximum value as the common value, the method ensures that each time base register 304 will be set to a value that is greater (or possibly equal to) than the existing value.

In block 514, the maximum value determined in block 512 is further adjusted to reflect the amount of time required to set values in each of the NSPs 202a. In one embodiment, the adjustment in block 514 includes adding a time constant TS to the maximum value determined in block 512, where TS represents the time required for switch 104 to write a value in one of the time base registers 304 (assuming no packet traffic delays are encountered).

After adjusting the time base register value in block 514, the adjusted time base value is then broadcast to each NUMA controller 212 in block 516 using a write time base packet. Upon receiving the adjusted values each NUMA controller 212 responds by storing the time base value from switch 104 in the corresponding time base register 304. After broadcasting the time base value to each node 102, switch 104 sets (block 518) the values of its own time base register 306 and initiates the resumption (block 520) of normal packet traffic among nodes 102 by broadcasting a resume packet type to each node 102.

The value in decrementer 402 is used to control the frequency of resynchronization. It may be adjusted based on the range of time base value received during the resynchronization process to make resynchronization less frequent if the values are close together and more frequent if they are far apart. The synchronization process may be repeated periodically to maintain consistency among the various time base registers over time. In one embodiment, the method 500 described above is invoked whenever the value in a register such as decrementer register 402 reaches a predetermined value such as zero. In this embodiment, the intial value in decrementer 402 reflects the frequency with which the resynchronization is initiated.

It will be apparent to those skilled in the art having the benefit of this disclosure that the present invention contemplates a mechanism for synchronizing time base registers on a multi-mode system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of synchronizing a set of nodes in a non-uniform memory architecture (NUMA) data processing system, comprising:

reading time base register values from each of the set of nodes;

determining a common time base register value based upon the set of time base register values received from each of the set of the nodes, wherein determining a common time base register value includes selecting the maximum of the time base register values read from each of the set of nodes; and broadcasting the common time base register value to each of the set of nodes.

2. The method of claim 1, further comprising, prior to reading the time base register values, halting packet traffic among the set of nodes by broadcasting a halt packet traffic to each of the set of nodes and determining when packet traffic drops below a threshold.

3. The method of claim 2, further comprising receiving time base register values from each node while the network traffic is halted, wherein the network transit time of each time base register value is substantially unaffected by network packet traffic.

4. The method of claim 3, further comprising, after broadcasting the common time base register value, resuming packet traffic among the set of nodes.

5. The method of claim 4, wherein resuming packet traffic includes broadcasting a resume traffic packet to each of the set of nodes.

6. The method of claim 1, wherein reading the time base register values includes issuing an interrupt from a node controller to a first processor of the node in response to receiving a read time base packet.

7. The method of claim 1, wherein determining the common time base register value further comprises adjusting the maximum time base register value by an adjustment factor.

8. The method of claim 7, wherein the adjustment factor is a function of the time required to read a time base register value and the time required to set a time base register value when packet traffic is halted.

9. The method of claim 1, further comprising repeating the synchronization process periodically to maintain the synchronization among the set of nodes.

10. The method of claim 9, wherein the synchronization is initiated each time the value in a decrementer register value reaches zero.

11. The method of claim 1, wherein reading time base register values includes issuing a read time base (RTB) packet type to each of the set of nodes.

12. The method of claim 1, wherein broadcasting the common time base register value includes issuing a write time base (WTB) packet type to each of the set of nodes.

13. A non-uniform memory architecture system comprising, a set of nodes, wherein each node includes at least one processor with a time base register and an adapter suitable for reading and writing time base register values;

a central switch connected to each of the node adapters; and wherein the central switch is configured to synchronize the time base registers of each of the set of nodes based upon time base register values received from each of the set of the nodes.

14. The system of claim 13, wherein the central switch is configured to synchronize the time base registers by retrieving values from each of the time base registers, determining a common time base value based on the retrieved values, and broadcasting the common time base value to each of the nodes.

15. The system of claim 13, wherein each node controller is configured to issue an interrupt to the at least one processor and wherein the processor is configured to respond to the interrupt by returning the value of the processor's time base register to the adapter.

16. The system of claim 13, wherein the central switch includes a set of ports corresponding to each of the set of nodes and further wherein each of the set of ports includes a port register suitable for storing a value retrieved from the time base register of the corresponding node.

17. The system of claim 16, wherein the width of each port register is compatible with the width of the time base register of the corresponding node.

18. The system of claim 13, wherein the central switch further includes a decrementing register, wherein the central switch initiates the synchronization of the time base registers when the value of the decrementing register equals zero.

19. The system of claim 18, wherein the frequency with which the synchronization process is initiated is controlled by adjusting the initial value of the decrementing register is adjustable.

20. The system of claim 13, wherein the operating frequency of the central switch varies from the operating frequency of at least one of the nodes, and further wherein the central switch includes multiplier/divider circuitry to compensate for the variation in operating frequency.

21. A central switch in a non-uniform memory architecture data processing system, comprising:

a set of ports, each of the ports corresponding to a node of the data processing system, wherein each port is suitable for connecting to a node of the data processing system and further wherein each port includes a port register suitable for storing a value retrieved from a time base register of the node;

a processor connected to each of the ports and capable of reading from and writing to the port registers; and a storage device configured with processor executable instructions for retrieving time base register values from each of the nodes, determining a common time base value based on the retrieved time base values wherein the determined common time base value preserves the monotonicity of each time base register, and broadcasting the common time base value to each of the nodes.

22. The central switch of claim 21, further comprising a switch register connected to the processor, wherein the processor stores the determined common time base value in the switch register.

23. The central switch of claim 21, further comprising a decrementing register connected to the processor, wherein switch initiates a synchronization of the time base registers when the value in the decrementing register reaches zero.

* * * * *